United States Patent [19]

Chodil et al.

[11] 3,733,435

[45] May 15, 1973

[54] INTEGRAL MEMORY IMAGE DISPLAY OR INFORMATION STORAGE SYSTEM

[75] Inventors: Gerald J. Chodil, Harwood Heights; Michael C. DeJule, Chicago, both of Ill.

[73] Assignee: Zenith Radio Corporation, Chicago, Ill.

[22] Filed: Feb. 26, 1971

[21] Appl. No.: 119,319

[52] U.S. Cl. ......178/7.3 D, 315/169 TV, 340/173 LS

[51] Int. Cl. ....................H04n 5/66

[58] Field of Search ....................178/7.3 D, 7.5 D; 313/108 B, 108 C, 108 D; 315/169 TU; 340/173 LS; 250/213 A

[56] References Cited

UNITED STATES PATENTS

| | | | |
|---|---|---|---|
| 3,479,517 | 11/1969 | Bray et al. | 250/213 A |
| 3,601,532 | 8/1971 | Bitzer et al. | 178/7.5 D |
| 3,609,747 | 9/1971 | Ngo | 340/166 EL |

*Primary Examiner*—Robert Z. Richardson
*Attorney*—John J. Pederson

[57] ABSTRACT

A memory system includes an array of memory elements, each of which is set to one of three or more memory states independently from the other elements by means of storage of one of a corresponding number of associated setting voltages. Readout of the memory-state information thus preset is accomplished by applying to the entire array a signal having a special periodic pulsed waveform with each memory state being associated exclusively with a different portion of the waveform, and each memory element responds only to that portion of the waveform associated with its particular preset state. The memory elements, each of which includes s capacitor in series with a bidirectional switch having both a high and a low impedance and characterized by a "breakback" response, "remember" their respective states throughout, until again reset to another state. A light valve or light source may be associated with and controlled by each memory element, thus affording an image display. Each memory state may be associated with an intensity or brightness level by modifying the waveform so that a different duty factor is associated with each memory state. A complete television image display incorporating a matrixed array panel of memory-display elements is described in which gray scale with storage is achieved by controlling the memory states, and thus the duty factors, of the respective elements of each row of the panel in accordance with respective samples of a line of video signal quantized to one of a fixed number of discrete intensity levels each of which is associated with a memory state.

14 Claims, 10 Drawing Figures

Inventors
Gerald J. Chodil
Michael C. De Jule
By Peter J. Sgarbossa
Attorney

Inventors
Gerald J. Chodil
Michael C. De Jule
By Peter J. Sgarbossa
Attorney

Inventors
Gerald J. Chodil
Michael C. De Jule
By Peter J. Sgarbossa
Attorney

Inventors
Gerald J. Chodil
Michael C. De Jule
By Peter J. Sgarbossa
Attorney

INTEGRAL MEMORY IMAGE DISPLAY OR INFORMATION STORAGE SYSTEM

BACKGROUND OF THE INVENTION

This invention relates to information storage systems and image displays with integral memory. In particular, the invention relates to a novel image display having a matrixed array of memory elements individually presettable to one of at least three active memory states to thereby store image information and with the readout of such stored information accomplished by means of a single signal having a periodic waveform addressed to all elements for the same number of integral cycles.

A need in the art has long existed for an information storage device of matrixed elements, especially one in the form of a display, which would store information independently for each element and minimize addressing requirements. One such memory capability which has been particularly sought has been a capacity for the storage of intensity information for each element with sufficient gradations of intensity level to afford a gray scale suitable for halftone image display. A concomitant need has existed for the improvement of the duty factor for the display elements so that maximum brightness is obtained.

Image displays having various types of matrixed elements and memory features and which attempt to meet these needs have recently begun to appear in the art; two of the more pertinent examples are the displays described in U. S. Pat. No. 3,522,473 to B. A. Babb, entitled "Electroluminescent Display Utilizing Voltage Breakdown Diodes," and in U. S. Pat. No. 3,479,517 to T. E. Bray et al., entitled "Solid State Light Emitting Display with Memory." Both systems are electroluminescent (EL) displays with a storage or memory characteristic; in the former, a voltage breakdown diode is placed in series with an electroluminescent cell, with the series excited by an effective AC signal. Thus charge may be stored on the EL element and alternately discharged and recharged by a proper addressing signal, thereby providing a means for selecting elements to be illuminated as well as improving the duty cycle. However, no applicability is found of this storage feature to the problem of providing gray scale. In the latter reference, a matrixed array of bi-stable diode elements controls a like array of light emissive elements, and a comparatively involved gray scale scheme is provided for the display wherein a plurality of such bi-stable diodes control each electroluminescent display element, to establish the intensity at a level determined by the number of controlling diodes in the ON position. That intensity level is then maintained until one or more of the control diodes are changed to the opposite state.

Another example is the copending application of Richard A. Easton, Ser. No. 755,961, filed Aug. 28, 1968, and now U.S. Pat. No. 3,590,156 and assigned to the same assignee as the present application, wherein a flat-panel display having a matrixed array of elements is associated with a separate memory system which provides a greatly-improved gray scale by modulating the duty factor of each element in accordance with a video signal. However, Easton does not disclose a display system of the type wherein each of the elements themselves has its own storage capacity or integral memory to minimize external addressing requirements, nor does Easton disclose a system in which readout of stored video information is accomplished by applying the same periodic waveform signal to all elements over a sustained time interval which is the same for all.

By contrast, in the development of the Plasma Display Panel, a simple memory scheme depending on a memory capability integral to the display elements was devised; however, it provided only two intensity levels and a zero intensity level; see the paper by Arora, Bitzer, and Slottow, University of Illinois, Champaign, Ill.; CSL Progress Report, Sec. 9, May 1967. This scheme consisted of charging each element of the panel to either one of two preselected charge levels associated with one of two light intensity levels, or to a zero level. A signal having a simple alternating waveform then adjusts the elements to cause the elements to glow at one or the other intensity level, or not at all, depending on its original setting charge.

Accordingly, it is an object of the present invention to provide a novel information storage system having an array of elements with integral memory.

It is another object of the invention to provide a novel information display device and system having an array of display elements each of which is independently presettable to any one of three or more memory states and each of which maintains its individual memory state throughout a readout period.

A further object of the invention is to provide a novel information display system having elements capable of a plurality of memory states each of which is associated with a different light intensity level to afford a gray scale sufficient for halftone image display.

Still another object of the invention is to provide a novel information display system in which stored light intensity information may be read out by addressing the same cyclic waveform signal to all elements, and in which brightness is maximized by duty factor modulation.

It is yet another object of the invention to provide a complete novel television display system.

SUMMARY OF THE INVENTION

In accordance with the invention, a memory system having at least three memory states comprises at least one memory element having a multi-level voltage storage capacity and exhibiting a conductivity to applied voltage which is responsive to the level of stored voltage. Means are provided for storing any chosen one of at least three predetermined setting voltages on the memory element, each such voltage respectively being associated with a corresponding memory state. Also provided are means for generating and applying to the memory element a voltage signal having a cyclic waveform with portions uniquely complementary to each of the setting voltages to enable the element set to a given setting voltage and corresponding memory state to conduct over only that portion of the waveform uniquely associated with that memory state, thereby manifesting the stored memory state of the memory element.

BRIEF DESCRIPTION OF THE DRAWINGS

The features of the present invention which are believed to be novel are set forth with particularity in the appended claims. The invention, together with further objects and advantages thereof, may best be understood by reference to the following description taken in connection with the accompanying drawings, in the several figures of which like reference numerals identify like elements, and in which:

DESCRIPTION OF THE PREFERRED EMBODIMENT

Figure 1:
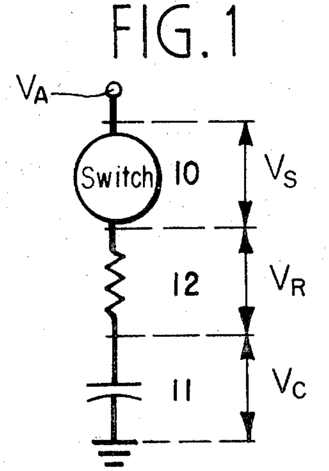
FIG. 1 is a schematic equivalent circuit diagram of the basic memory display element according to the invention.

In FIG. 1, the basic memory and display element used in the invention is shown to include three basic components, a switch 10, a capacitor 11 and a resistance 12 connected in series. The resistance 12 may represent merely the inherent resistance usually found in any series circuit; it may also represent a light modulating or emitting element, in which case the basic memory element is also a display element. Another example of a display element according to the invention is one wherein the capacitor 11 is light-emitting, as may be achieved by constructing capacitor 11 from any of the dielectric electroluminescent materials well known in the art. Still another type of display element is one wherein the switch functions also as the light emitter, as is the case with an element which is part of a Plasma-Display Panel, a well-known display device comprising a matrix array of gas-filled cell elements each in series with a capacitance.

Figure 2:
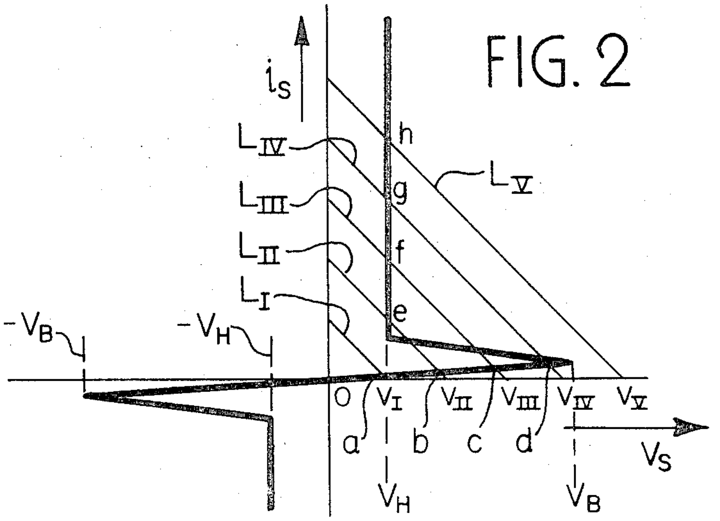
FIG. 2 illustrates the characteristic operation of the switch of the FIG. 1 element with a plot of the current through the switch as a function of the voltage applied across the switch.

The switch 10 in the basic memory display element of FIG. 1 must be one whose characteristic operation is as illustrated graphically in FIG. 2, which is a plot of the current $i_s$ through the switch as a function of the voltage $V_s$ applied across the switch. As can be seen, at a well-defined characteristic level of applied voltage, denominated $V_B$, whose exact value depends on the component characteristics, a dividing point is established between a high impedance state and a low impedance state, so that the switch possesses the characteristic commonly known as voltage breakback. The switch must also be bidirectional, with a similar breakback characteristic when the applied voltage polarity is reversed, preferably with symmetry about the origin, as illustrated, although this is not necessary. Some examples of specific switches having these characteristics are ovonic threshold switches, neon glow lamps, the gas in a plasma display panel, and three- and four-layer diodes.

A more specific treatment of the operation of the switch will facilitate proper appreciation of the operation of the complete memory element as used in the present invention. Again referring to FIG. 2, five load lines $L_I$ through $L_V$ are established for different applied voltages $V_I$ through $V_V$, respectively, assuming a constant load impedance such as the resistance 12. Then for voltages $V_I$ and $V_V$, the switch provides monostable operation at the operating points *a* and *h*, in the high impedance and low impedance states respectively. However, voltages $V_{II}$ through $V_{IV}$ provide bistable operation, with points *b*, *c* and *d* in the high impedance state, and points *e*, *f* and *g* in the low impedance state.

It can be seen from FIG. 2 that if the switch is biased in the high impedance state at voltage $V_{III}$, i.e., at point *c*, changing the voltage to $V_{II}$ of $V_{IV}$ will not change the switch condition; it will remain in a high impedance state. However, if the applied voltage becomes greater than $V_B$, increasing for example to $V_V$, the operating point changes to near *h* which is in the low impedance state. Now even if the applied voltage is decreased below $V_B$ to $V_{IV}$, or even $V_{III}$ or $V_{II}$, the switch will remain in the low impedance state with operating points at *g*, *f* and *e*, respectively. Eventually, of course, reduction of the voltage below a second characteristic level, (denominated $V_H$, the minimum holding voltage required to maintain the low impedance state), whose exact value depends on the component characteristics, will cause the switch to again assume its high impedance state. For example, reduction of the voltage to $V_I$, which is less than $V_H$, causes the operating point to change to *a* and the high impedance state to be resumed and maintained until the applied voltage is again increased beyond $V_B$.

The operation of the basic memory-display element of FIG. 1 can now be discussed with reference to its behavior under an applied voltage $V_A$ larger, at least initially, than the breakdown voltage $V_B$. For simplicity, we will assume that the resistor 12 is much smaller than the OFF resistance of the switch 10. This guarantees that when the switch is in the high impedance state with no charge on the capacitor 11 and a voltage pulse is applied, essentially all of that voltage appears across the switch 10, so that initially $V_s \approx V_A$. With no charge initially on the capacitor 11 and no applied voltage, the switch 10 assumes its low impedance state; and when $V_A$ exceeds $V_B$ and a high current flow is established, the capacitor charges in accordance with the time constant, which is approximately RC, building voltage $V_C$ on the capacitance in opposition to the applied voltage $V_A$. At any time after charging is initiated, the applied voltage may be reduced so that the voltage across the switch is less than the holding voltage $V_H$, in which case the switch returns to its high impedance state, trapping the charge on the capacitor, since it cannot leak off through the switch's high impedance. If instead the applied voltage is allowed to persist, the charge continues to build and the load line effectively changes, starting at about $L_V$ and finally ending near $L_{II}$, since the current through the switch decreases. The instantaneous capacitor voltage $V_C$ is $V_A - V_H - IR$, where I is the current flowing in the circuit. When the load line nears $L_H$, I is approximately zero, and the switch returns to the high impedance state, trapping a charge on the capacitor so that $V_C = V_A - V_H$, which persists despite the removal of $V_A$.

The basic memory display element thus exhibits a capability for controllably storing any voltage in the range from zero to $V_A - V_H$. With an applied voltage signal having a specially designed waveform, this capability may be exploited for the purpose of obtaining many memory states, as will be explained with reference to FIGS. 3 and 3A, the latter figure illustrating various possible control or setting pulses as plots of voltage against time. Since as we have seen, the capacitor requires a finite fixed time interval to reach full charge for a given steady applied voltage, the amount of charge set on the capacitor may be controlled by choosing different values of steady applied voltages to be held for equal time intervals (FIG. 3A*d*), or by varying the duration of one voltage held at a steady value (FIG. 3A*c* and the setting pulse of FIG. 3), or decreasing or increasing the applied voltage while the switch is in its low impedance state (FIGS. 3A*a* and 3A*b*). It should be noted that in any case the voltage must initially reach and maintain a value of $V_B$ long enough to insure that the switch assumes its low impedance state.

A circuit will be described in FIG. 6A which may be used to develop and apply such pulses to the memory-display element so as to cause the element to store any one of three predetermined setting voltages. These may be denominated as $V_C$, $V_C'$, and $V_C''$ and have differing magnitudes; the following condition will be imposed for simplicity:

$$V_C > V_C' > V_C'' > 0 .$$

Figure 3:
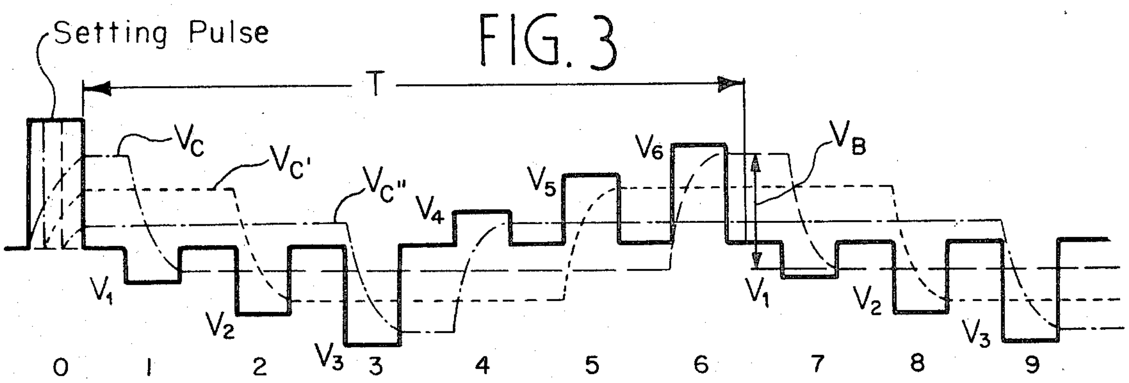
FIG. 3 illustrates the waveform of the signal which is applied to the memory element of FIG. 1 to manifest its memory state by conduction on different pulses in accordance with the memory state.
Figure 3A:
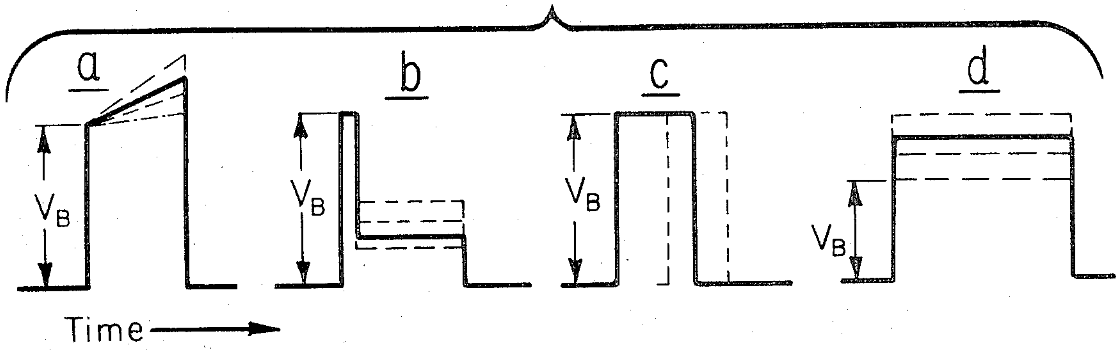
FIG. 3A shows examples of setting pulses which may be applied to the memory element of FIG. 1 to store voltage representative of a memory state.

Referring now to FIG. 3, the unbroken line is representative of the applied voltage directed to the memory element of FIG. 1, while the three broken lines represent the voltage level on the capacitor 11, starting with each of the three possible setting voltages. In particular, immediately after the completion of the setting pulse 0 and the beginning of time period T, the voltage stored will be at one of these three levels. It should be noted that the largest stored voltage $V_C$ must not exceed $V_B$ to insure that the switch does not conduct when the setting pulse returns to zero. Thus, $$V_C < V_B .$$

Each such setting voltage is associated with a corresponding memory state in order of decreasing or increasing voltage magnitude. In the present case, a setting voltage of $V_C$ is associated with a first memory state 1, a lesser voltage $V_C'$ with a second state 2 and a still lower voltage $V_C''$ with a third state 3.

Once the pulse setting the element to one of the memory state levels has addressed the element, a voltage signal having the cyclic waveform of period T illustrated in FIG. 3 is applied to the element to manifest the memory state of the element. A means for generating this signal will be described below in connection with FIG. 5. It will be seen that the respective pulses within each complete cycle of the waveform are arranged in order of ascending magnitudes, with the pulses of each respective polarity grouped together. Each negative pulse has a companion positive pulse so that within a given waveform period T a fixed number of pulse pairs, in this case three, having equal peak-to-peak excursions is found. For example, pulses 1 and 6, 2 and 5, and 3 and 4 respectively form such pulse pairs having equal peak-to-peak excursions. The peak-to-peak amplitude of the entire waveform must always be less than twice $V_B$, which may be stated as:

$$V_C'' > V_C - V_B + V_H .$$

This will provide for an additional non-conducting, or zero, memory state as will be further explained below. This condition is also necessary to make the memory element conduct on one pulse pair and no other. The relationship between the stored setting voltages $V_C$, $V_C'$, $V_C''$ and the waveform pulse voltages $V_1$, $V_2$, $V_3$, $V_4$, $V_5$ and $V_6$ is such that the largest setting voltage $V_C$ together with the smallest negative pulse 1 and then the largest positive pulse 6 successively cause the voltage $V_B$ to appear across the switch and hence cause conduction on both the negative and positive pulse components of the pulse pair. Similarly, the smallest setting voltage $V_C''$, the largest negative pulse 3 and the smallest positive pulse 4 also successively cause a voltage $V_B$ across the switch and hence conduction on the negative and positive pulse components of the pulse pair. The intermediate setting voltage level $V_C'$ causes conduction on the intermediate negative pulse 2 and positive pulse 5.

For the three-memory-state waveform of FIG. 3, the complete set of pulse voltages $V_1$ through $V_6$ are defined as follows:

| | |
|---|---|
| $V_1 = V_C - V_B$ | $V_6 = V_C + V_H$ |
| $V_2 = V_C' - V_B$ | $V_5 = V_C' + V_H$ |
| $V_3 = V_C'' - V_B$ | $V_4 = V_C'' + V_H$ . |

This treatment assumes the switch characteristic of the element 10 to be symmetric about the origin, as in FIG. 2 with the characteristic voltage levels $V_B$ and $V_H$ the same for both polarities. However, any non-symmetry in switch response with polarity change may be easily compensated by the use of additional voltage increments to obtain the above-described memory behavior. When the above conditions have been fulfilled, each pulse pair of the waveform is uniquely associated with one of the stored setting voltages, and thus with the memory state which it represents. The presence of three memory states and a zero or non-conducting state has been experimentally verified, and experimental values for the above voltages have been obtained, in the case of at least one type of memory element, an experimental plasma display cell filled with neon and nitrogen and having switching characteristics as described in FIG. 2. $V_B$ and $V_H$ were found to be 800 and 100 volts respectively; and

| | |
|---|---|
| $V_1 = -200V$ | $V_6 = +700V$ |
| $V_2 = -450V$ | $V_5 = +450V$ |
| $V_3 = -650V$ | $V_4 = +250V$ |

Due to the nature of the plasma display panel, i.e., the fact that its electrodes are strictly external, it was not possible to directly measure $V_C$, $V_C'$ and $V_C''$. Nevertheless, indirect investigation indicates that:

$V_C = 600$ volts, $V_C' = 350$ volts, and $V_C'' = 150$ volts. It should be understood that a DC voltage may be added to the waveform of FIG. 3, allowing a greater freedom in the choice of the setting voltage values.

The operation of the basic memory display element of FIG. 1 under the FIG. 3 applied signal, whereby the memory state stored on the element is manifested, will now be discussed. The setting pulse may take any of the forms generally represented in FIG. 3A which will cause the capacitor 11 to store one of the three predetermined voltages $V_C$, $V_C'$, and $V_C''$. Let us first assume that voltage $V_C$ associated with memory state 1 is left on the capacitor at the end of that setting pulse. The first pulse of the waveform, pulse 1, has a negative excursion $V_1$ of a magnitude which when added to that of $V_C$ causes the voltage across the switch to equal the characteristic breakdown voltage $V_B$. Thus the switch is changed to its low impedance state and current flows through the memory element, charging the capacitor to a new and negative value. The duration of pulse 1, as well as that of the other pulses, is not critical, the only restraint being that it have a duration sufficiently long so that the capacitor fully charges for the applied voltage $V_1$. As the capacitor charges the applied voltage is opposed, and the current through the switch goes to zero, and again the switch returns to its high impedance state, trapping the charge on the capacitor. Thus the capacitor voltage $V_{C_1}$, after the pulse 1, is $V_1$ less the holding voltage $-V_H$, or $$V_{C_1} = V_1 + V_H \ .$$

Pulse 1 is followed by additional negative pulses 2 and 3, and then by positive pulses 4, 5 and 6. Pulses 2 and 3 have sequentially increasing negative excursions, pulse 2 having a value $V_2$ which when added to the preset capacitor voltage $V_C'$ for memory state 2 exceeds the breakdown voltage $V_B$, and pulse 3 having a value $V_3$ which when added to the preset capacitor voltage $V_C''$ for memory state 3 also exceeds the breakdown voltage $V_B$. Positive pulses 4, 5 and 6 in that sequential order are respectively analogous to the negative pulses 1, 2 and 3, as are their excursion voltages $V_4$, $V_5$ and $V_6$; however, the magnitudes of the analogous positive and negative pulses are usually different, as reference to their previously given definitions will show. Passage of pulse 6 completes one entire waveform cycle, and with pulse 7, an exact repetition of pulse 1, the cycle begins to repeat. It should be noted that all the pulses may be moved closer together to eliminate the intervals of zero amplitude, as long as the pulses are of a duration sufficient to fully charge the capacitor as discussed above.

For pulses 2 and 3, the voltage differences set up across the switch by the combination of the capacitor voltage $V_{C_1}$ after pulse 1 and the applied voltages $V_2$ and $V_3$ do not exceed the firing voltage $V_B$ of the switch. For pulses 4 and 5, the same holds true; the voltage stored on the capacitor continues to be the same, and the voltage difference across the switch is not great enough to cause its changing to the low impedance state. However, with pulse 6, the combination of the stored voltage with the applied voltage pulse $V_6$ exceeds the firing voltage $V_B$. The switch then changes to the low-impedance state and the capacitor assumes a new, positive voltage of $V_6 - V_H$. This is the same voltage $V_C$ as that originally set for state 1, and at this point the cycle begins anew with pulse 7 the same amplitude as pulse 1, and the switch and capacitor again changing state and recharging, respectively.

Instead of being placed in memory state 1, the capacitor of the memory element may be charged initially to a voltage of $V_C'$ by using a shorter setting pulse, so that the element exhibits memory state 2. Then when the cyclic waveform of FIG. 3 is applied to the element, the element will now conduct during pulse 2, which causes the requisite breakdown voltage $V_B$ to be developed across the switch, and in so doing recharges the capacitor to exhibit a new negative voltage of magnitude $V_2 + V_H$. The memory element now ignores pulse 1 as well as pulses 3 and 4, since the switch maintains its high-impedance state, with neither of the pulses setting up a voltage difference of $V_B$ across the switch. With pulse 5, the $V_B$ voltage difference is again obtained, allowing a current flow recharging the element capacitance to a positive voltage of magnitude $V_5 - V_H$. Thus the charge originally set for state 2 is restored, the element ignores pulses 6 and 7, which do not cause a voltage difference of $V_B$ to develop, and the cycle begins anew with pulse 8 which is the same amplitude as pulse 2. The same selectivity or memory is obtained if, instead, the memory element is set to memory state 3 by initially storing on the capacitor a voltage of $V_C''$. The element will then ignore pulses 1 and 2 while conducting on 3, and on the positive half-cycle, ignore pulses 5 and 6 after conducting on pulse 4, continuing indefinitely in this manner until the waveform is permanently stopped or its memory state is changed. Thus this same waveform of FIG. 3 will, if applied in a repeated manner, cause the memory element of FIG. 1 set to any given one of the states, to conduct only on those pulses of every cycle associated with that given state, sustaining the element in that state as long as the waveform is repeated in integral numbers of cycles. Therefore, the waveform of FIG. 3 will hereinafter be termed the "multistate sustain waveform," or MSW.

As had been implied above, the element may also be placed in a non-conductive, zero memory state. This is accomplished by setting the capacitor to a small voltage which will ensure that the element remains non-conductive for all portions of the MSW signal. This stored voltage for the zero state, $V_O$, may for example, be merely zero, or it may be another small positive or negative voltage fulfilling the condition that:

$$V_C + V_H - V_B < V_O < V_C'' \ .$$

It is very important to note also that more than merely three conducting memory states may be achieved using the same basic element and the same basic type of construction for the cyclic waveform signal. For each additional memory state desired, it is necessary to add one pulse larger than those already present to each of the negative and positive sections of the waveform, maintaining the sequential order of increasing magnitudes and the corresponding limitations earlier stated, and readjusting the stored voltage levels for the capacitor and the pulse excursion voltages so that the peak-to-peak amplitude of the complete waveform continues to be less than $2V_B$. The equations for the revised amplitudes of the pulse pairs are obvious from those already given for $V_1$ through $V_6$. Also, despite the foregoing specification as to magnitude, sequence of pulses, and polarity of pulses, much latitude is allowed in the construction of the MSW. For example, we have seen that the pulses need not always be separated or returned to a zero voltage as in FIG. 3. Also, other wave shapes such as triangles, half-sine waves, etc. may be used in the construction of a waveform and as stated earlier, the waveform can be DC shifted.

Figure 4:
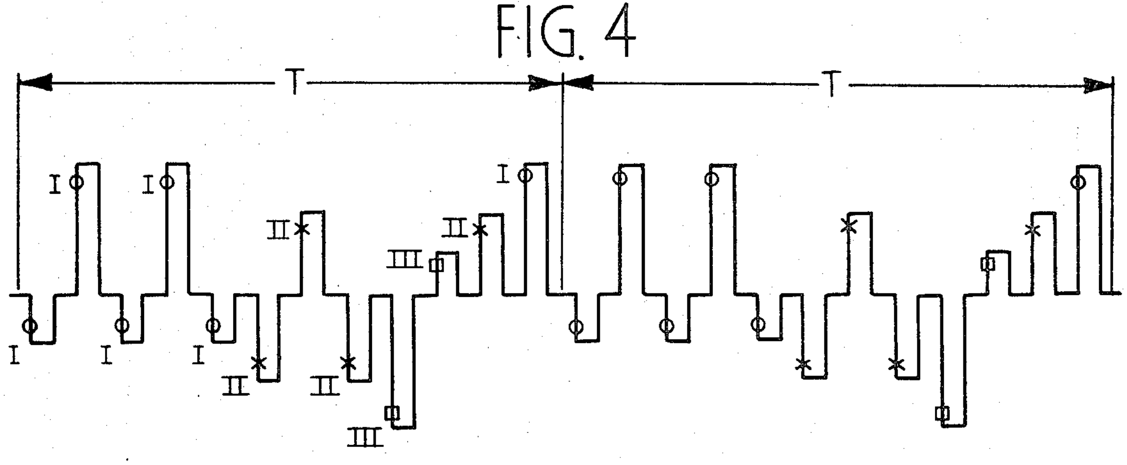
FIG. 4 illustrates a waveform as in FIG. 3 modified by additional pulses in order to manifest the respective memory states of the memory element by respective different duty factors.
Figure 4A:
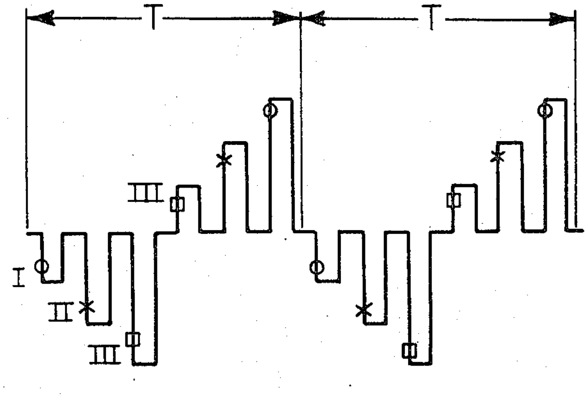
FIG. 4A is the waveform of FIG. 3, marked to illustrate the pulses on which conduction takes place for each memory state.

It is desirable from the viewpoint of the display art and also to facilitate detection of the memory state of the element to associate a different duty factor or light intensity level, or both, with each of the memory states in use. This must be done according to the invention in a certain ordered manner, which is illustrated in FIG. 4 for the three-memory-state case. For comparison purposes, FIG. 4A illustrates the simple three-memory-state waveform of the type just described in FIG. 3 with appropriate labellings at the pulses upon which conduction will take place for each of the different states. Referring to that Figure, for example, we see that with an element preset to a memory state 1, conduction will take place only on the pulses marked with a circle and similarly for the other states, those marked with an X and with a square, respectively. Of course, the particular memory state of the element can be detected by conduction current pulse coincidence measurements; however, the modification as illustrated in FIG. 4 allows, at least in the case of an element with an associated light display capability, the memory states to be differentiated by light intensity levels, with state 2 having twice as many pulses and being twice as bright as state 3, and state 1 having three times as many pulses and being correspondingly three times as bright as state 3.

More specifically, state 2 is increased in brightness with respect to state 3 by adding an additional complementary pulse pair immediately after the original state 2 pulses in a manner such that the voltage level on the capacitor is left at the same value as was the case without the addition of such pulses. Thus in the case of state 2, a positive pulse is added after the original negative state 2 pulse, followed by yet another negative pulse, each of the duplicating pulses being of the same magnitude as the original state 2 pulses. The number of pulse pair duplicates which are added then determines the relative increase in brightness of that state with respect to the other states. State 1 is handled similarly with complementary pulse pairs being added after the original negative state 1 pulse, but with two additional pairs added so that it now becomes the brightest of the three states. Thus the memory feature is preserved, with the element conducting or lighting only on pulses associated with its preset state, as before, but now with a different duty factor or number of conductions or illuminations per waveform period. For example, using the FIG. 4 case, within a given waveform time period T, more conductions or illuminations will occur for state 1 than for state 2 and in turn, more conductions or illuminations will occur for state 2 than for state 3. Of course, the MSW is preferably applied to the element only in integral numbers of cycles to preserve without distortion the relationship between the duty factors of the respective memory states. This capability for duty factor control of the element is highly useful in a display context.

Figure 5:
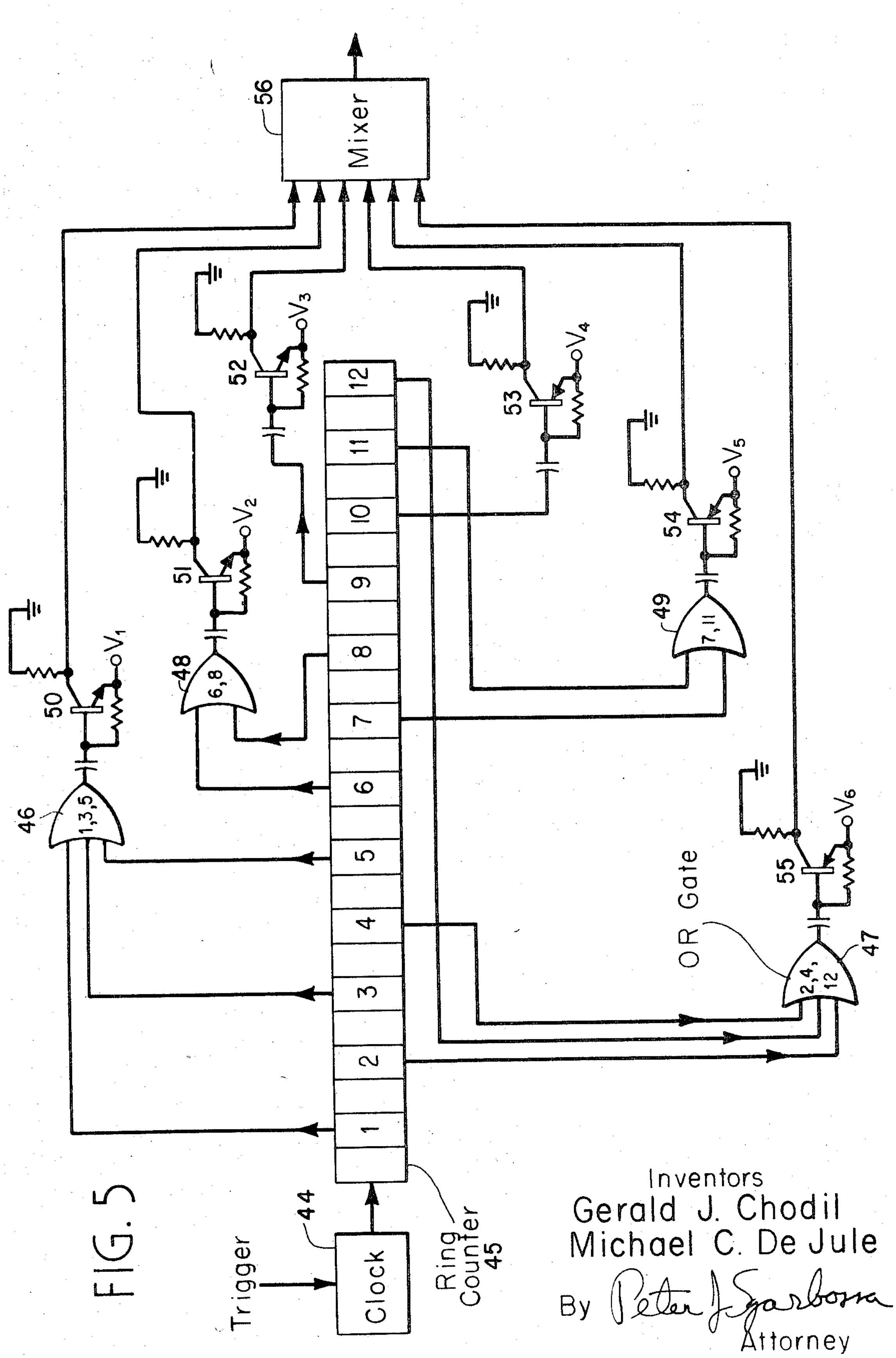
FIG. 5 is a schematic diagram of a generator for producing the FIG. 4 signal.

FIG. 5 illustrates one possible generator for the FIG. 4 Multistate Sustain Waveform as described above, with the capability of reading out three memory states and having a different intensity level associated with each state. The device comprises a clock 44 producing trigger pulses and a 24-element ring counter 45 acting as a commutator of the trigger pulses. The clock 44 is set so that the ring counter 45 completes one complete cycle through all 24 elements in the time T allotted for one complete cycle of the waveform. Four OR gates 46–49 and six simple transistor voltage controls 50–55 are provided to yield voltages $V_1$, $V_2$, $V_3$, $V_4$, $V_5$ and $V_6$, respectively, with the voltage sources and controls being switched sequentially by the ring counter 45 directly or through respective OR gates. The voltage controls consist of NPN transistors 50–52 controlling direct current sources of the respective negative voltages $V_1$, $V_2$, and $V_3$ and PNP transistors 53–55 controlling corresponding sources of the positive voltages $V_4$, $V_5$ and $V_6$. In all cases the transistors are normally biased OFF so that the collector is at ground and no voltage output is allowed.

In more detail, elements 1, 3 and 5 are connected to OR gate 46 which in turn actuates voltage control 50 and source $V_1$. Elements 2, 4 and 12 are connected to OR gate 47 which actuates transistor control 55 and source $V_6$, while elements 6 and 8 are connected to OR gate 48 which actuates voltage control 51 and source $V_2$, and elements 7 and 11 are connected to OR gate 49 which actuates voltage control 54 and source $V_5$. In the case of $V_3$ and $V_4$ the elements 9 and 10 of the ring counter are directly connected to voltage controls 52 and 53, and sources $V_3$ and $V_4$, respectively. The collector of each transistor is then connected to a mixer 56 which is a single operational amplifier, thus merging the output of the respective voltage control circuits into a single terminal.

In the case of voltage sources $V_1$, $V_2$, $V_5$ and $V_6$, trigger pulses from the ring counter in turn enable the OR gates 46, 48, 49 and 47, respectively, which then turn on transistors 50, 51, 54 and 55 with their collectors going to the emitter voltage, thus transmitting the full source voltage to the mixer for the duration of the trigger pulse. At the end of the trigger pulse for that element, the ring counter goes to a blank element, allowing an interval of time equal to the clock period to pass, thereby insuring a zero level in the resultant waveform for that time duration. The $V_3$ and $V_4$ voltage source transistor controls 52 and 53 are directly actuated by elements 9 and 10 of the ring counter, receiving a trigger pulse causing the transistors to conduct and the full source voltage to be transmitted to the mixer for the trigger pulse duration.

It will be noticed that three times as many $V_1$ and $V_6$ pulses as $V_3$ and $V_4$ pulses, and twice as many $V_2$ and $V_5$ pulses as $V_3$ and $V_4$ pulses, are produced in this manner and the order of actuation of the various voltage source is such that the waveform of FIG. 4 is produced, with six voltage levels and three light intensity levels. Of course, other brightness levels may be associated with the six voltage levels or a waveform with additional voltage levels beyond six may be constructed in the same manner to produce more than three brightness or intensity levels.

Figure 6B:
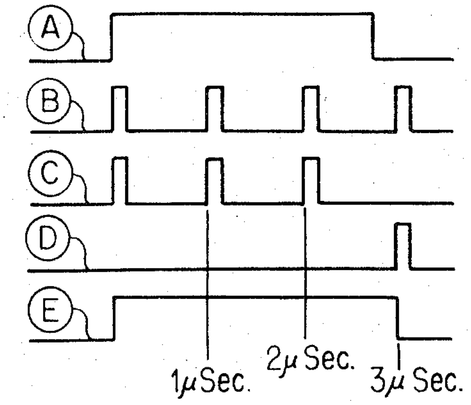
FIG. 6B is a plot of waveforms useful for understanding the operation of the FIG. 6A quantizer.
Figure 6A:
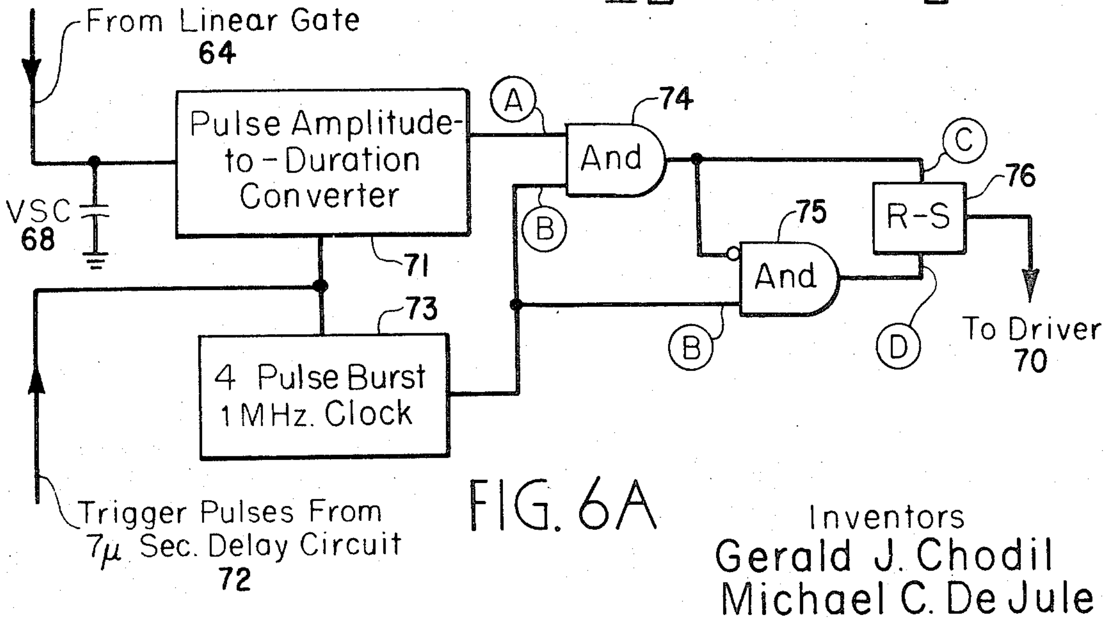
FIG. 6A is a schematic diagram of a detail of the FIG. 6 system for quantizing a video signal into discrete intensity levels and associating such levels with respective memory states to be stored on the display.
Figure 6:
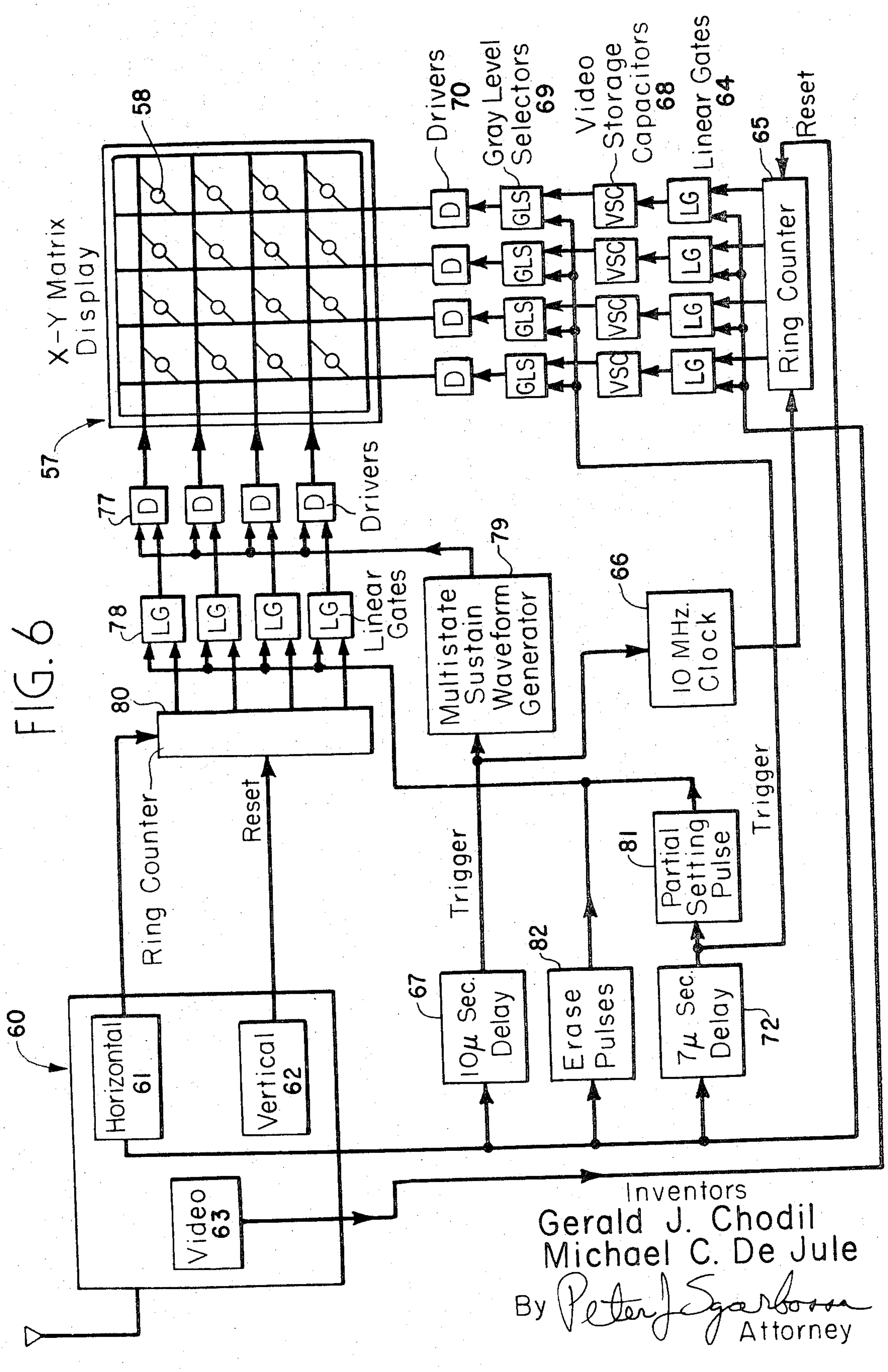
FIG. 6 is a schematic diagram of a complete television display system using a matrixed array of the elements of FIG. 1 for display and information storage.

FIG. 6 depicts a complete television display system utilizing an image display panel 57 with memory-display elements 58, each having the characteristics of the FIG. 1 element, distributed in a matrix of rows and columns. Every element of a given row is addressed with image information simultaneously, and the respective rows are addressed sequentially in the usual "line at a time" fashion, with the sequential image information being derived from a video signal furnished by a standard television receiver 60, which also furnishes a horizontal synchronization signal and a vertical synchronization signal.

In general, each element in the addressed row is set to a voltage representing one of three memory states in accordance with the intensity level of a corresponding portion of a line of video information during a portion of the retrace period of the standard television line time, while during the trace or scan period portion of the line time, a waveform generator such as that of FIG. 5 delivers the cyclic waveform of FIG. 4 to all of the elements, which of course, "remember" their respective states throughout the entire frame time, until the settings of a row are changed by a subsequent addressing. The FIG. 4 waveform insures a different duty factor for each element, according to its preset memory state, thereby causing the stored video information to be reproduced. A more detailed description of the display system will now be given in conjunction with FIGS. 6, 6A and 6B.

During the scan portion of each line time, not only is all the previously-set intensity information displayed, but also a storage of the video line being transmitted during that time takes place. This provides the means for resetting simultaneously all the elements of each row in sequence during the next retrace period. To accomplish such video information storage, a standard television receiver 60 furnishes video image information in the usual sequential line-by-line and time-variant amplitude manner, with each line time of 63.5 microseconds in duration, and retrace and trace times of 10 and 53.5 microseconds, respectively. The receiver includes a source 61 of a horizontal sync signal generated at the beginning of the line retrace time, and a source 62 of a vertical sync signal generated at the beginning of each new frame. A video signal source 63 is connected to each of a bank of linear gates 64, one for each column of the display, each such gate also receiving an input signal from a different element of a conventional ring counter 65. The counter is synchronized to the horizontal signal source 61 of television receiver 60 and driven by a 10 MHz clock 66 beginning 10 microseconds after the beginning of each horizontal line signal, with the clock being actuated by the 10-microsecond delay circuit 67 which in turn is connected to horizontal signal source 61. Thus each gate sequentially receives an enabling signal of equal duration over each trace time during which it is receptive to the video signal and the incoming line of video information is segmented, each gate in turn passing that portion of the video signal being transmitted during its "ON" time. The average amplitude of each signal segment is stored as a voltage on one of a plurality of video storage capacitors 68 which are respectively connected to the gates 64.

The line of image-intensity information thereby stored must then be translated into one of a predetermined number, in this case three, of different voltage pulses on each element of a row before the information may be displayed, as we have seen. One method for accomplishing this, as discussed in connection with FIG. 3A, is to apply a voltage of magnitude equal to the firing voltage for the elements and modulate the duration of time over which that voltage is applied, thereby leaving the element with varying magnitudes of stored voltage, depending on the pulse time length. Of course, if in addition, the duration times are quantized, the charge will accordingly be deposited in discrete quantized increments. This is precisely the purpose of the Gray Level Selectors 69, which during the last 3-microsecond portion of each retrace period process the information stored on each corresponding Video Storage Capacitor 68 to quantize it into a pulse of one of three durations, either 1, 2 or 3 microseconds. The drivers 70 then receive the resultant memory state setting pulses for amplification and transmission to the respective columns of the display panel 58.

FIG. 6A illustrates the construction of each of the Gray Level Selectors 69. A standard pulse amplitude-to-duration converter 71 is connected to the associated Video Storage Capacitor 68 of FIG. 6; in turn, a 7-microsecond delay trigger circuit 72, illustrated in FIG. 6, is connected to the converter 71 as well as to a 1 MHz clock 73. Delay circuit 72 delivers a trigger pulse 7 microseconds after each horizontal sync signal pulse, actuating both converter 71 and clock 73 simultaneously, both of which then operate over the remaining 3 microseconds of the retrace period. The clock 73 is set to stop after delivering only four pulses at 1 microsecond intervals. The pulse amplitude-to-duration converter 71 as usually found in the art consists of a constant current circuit for discharging the capacitor 68 at a constant rate and a Schmitt trigger circuit producing a pulse which continues until a predetermined discharge level of the capacitor 68 is sensed. The converter is adjusted to render output pulses of a constant amplitude but with a duration which varies from 0 to 3 microseconds according to the magnitude of the stored capacitor voltage.

This output must now be quantized, and to that end it is directed to AND-gate 74, the remaining input of that gate being connected to clock 73. The clock output also is connected to AND-gate 75, the other input of that gate incorporating an inverter and being connected to the output of AND-gate 74. The final element of the circuit is R-S Flip Flop 76, the S input of which is connected to the output of gate 74, and the R input of which receives the output of gate 75.

The quantization may best be described with reference to the waveforms denoted by the letters A through E of FIG. 6B; waveform A denotes the output of converter 71. The particular case illustrated is the quantization of an output pulse from converter 71 having a duration somewhat less than 3 microseconds, represented by waveform A. That waveform is converted to the closest, larger discrete level, namely, 3 microseconds; of course, the pulse of waveform A may have any value between 0 and 3 microseconds depending on picture content. Waveform B illustrates the output of the clock 73 which, for each actuation, consists of four pulses only at 1-microsecond intervals. Both waveforms begin at the same moment, i.e., 7 microseconds after the beginning of the horizontal sync signal pulse. The waveforms A and B are respectively received by the inputs of AND-gate 74. During time intervals where both waveforms have a non-zero value, that coincidence will give rise to an output; in the illustrated case, the first 3 clock pulses are passed by gate 74 but not the fourth, since by that time the waveform A voltage is zero. This gate 74 output is illustrated by waveform C which is now directed both to the S input of the R-S Flip Flop 76 and to one input of AND-gate 75 where it is first inverted before utilization. The other input of gate 75 also receives clock pulses from clock 73.

The output resulting from gate 75 is waveform D, which is a single pulse, in this instance occurring 3 microseconds after actuation, which marks the time when the coincidence occurs between a clock pulse and an absence of a pulse in the gate 74 output. This pulse goes to the R input of the R-S Flip Flop 76. Waveform E is the quantized version of waveform A and is the output from the R-S Flip Flop 76. The S input receives waveform C, actuating the Flip Flop to initiate waveform E. Once actuated, the Flip-Flop output persists at the original level until a signal is received at the R input. Since that input receives the D waveform from AND-gate 75, a pulse will only be present at the R input when no C pulse is present at the moment a clock pulse occurs. The Flip-Flop output ceases with the D pulse, which thereby acts as a cutoff signal, insuring that the E output waveform is a pulse of either 0, 1, 2 or 3 microseconds duration, in this example, 3 microseconds. In the same manner, if the A waveform is between 1 and 2 microseconds in duration, the circuit operates to quantize it to exactly 2 microseconds; if between zero and 1 microsecond, the circuit operates to quantize it to exactly 1 microsecond; and if zero microsecond for the A waveform, zero microsecond for the E output. Thus the A pulse of FIG. 6B which in duration is directly proportional to the stored voltage on the capacitor 68, is converted to a pulse quantized in duration to the next largest one of four values. In other words, assuming $V_{max.}$ to be the largest value of stored video voltage on the video storage capacitor, video signals producing zero volts on the storage capacitor 68 produce a zero amplitude setting pulse; small video signals, or those producing a voltage on the capacitor greater than zero but less than 1/3 $V_{max.}$, are quantized to a 1-microsecond setting pulse; those video signals of an intermediate value, or greater than ⅓ $V_{max.}$ but less than ⅔ $V_{max.}$, are quantized to a 2-microsecond setting pulse; and large video signals, between ⅔ $V_{max.}$ and $V_{max.}$ in value, are quantized to a full 3-microsecond setting pulse.

Thus in the present three-memory-state embodiment, each stored capacitor voltage will give rise to a dark, dim, intermediate, or bright display element. Of course, many more levels of gray scale or intensity are possible if more memory states are incorporated. In the case of $n$ memory states of the display, the quantization would be into $n$ levels, corresponding to $n + 1$ clock pulses. If a non-linear quantization is needed, it can be accomplished by making the intervals between clock pulses non-linear or the current source in the "Pulse Amplitude-to-Duration Converter" non-linear.

Now referring again to FIG. 6, each such quantized pulse, while being formed by the discharge of each video storage capacitor 68 through its respective Gray Level Selector 69 during the last 3 microseconds of each retrace period upon signal from delay circuit 72, is passed to a respective one of Drivers 70. The Drivers pass the pulses to the respective columns of panel 57 while amplifying the pulse magnitudes uniformly and are adjusted to insure that the amount of charge which the 1, 2 and 3-microsecond pulses deposit will complement the respective levels of the cyclic waveform to be used for read-out. The selection of the row whose elements will be addressed by the setting pulses emanating from the Drivers 70 is determined by a vertical scanning arrangement which in turn is synchronized to the horizontal and vertical sync sources 61 and 62 of receiver 60.

More particularly, each row of the display is connected to a Driver 77, each of which in turn is connected both to the output of a linear gate 78 and the Multistate Sustain Waveform generator 79. The generator is constructed as earlier described in connection with FIG. 5, with clock 44 of that figure being connected to delay circuit 67 to be triggered thereby 10 microseconds after the horizontal sync signal begins, and mixer 56 of that figure supplying each Driver 77 with the generator output. One of the inputs of each gate 78 is connected to one element of a conventional ring counter 80 which is connected for synchronization to both the horizontal and vertical sources of sync 61 and 62. Each of the gates thereby sequentially receives enabling signals from the counter for a period at least equal to the retrace time, with the counter being reset at the end of the frame time. During the last 3 microseconds of the retrace time the gate which is thereby enabled serves to complete the path to the addressed row for the quantized setting pulse.

The first 7 microseconds of the retrace period, however, is reserved to erase the stored information persisting on the elements from the previous addressing, and during this time, the enabled gate completes a circuit between its associated row and an erase pulse generator 82. The latter is a conventional alternating signal generator connected to horizontal signal source 61 to sense the beginning of each retrace period. During the erase portion of each retrace period, the generator transmits an alternating signal to the row of elements selected to be addressed having positive and negative pulse amplitudes larger than $V_B$, but less than $V_B + V_H$, and timed to stop at a point when the voltage on the capacitors 11 has been brought to a small predetermined value to insure that the next pulse, which is the setting pulse, will always make the switch conduct. This small voltage value is one which is within the range previously given for the zero memory state.

During the next 3 microseconds, it will be noticed that it is only the row to be addressed, whose associated gate has been enabled by ring counter 80, which is affected by the setting pulses; the non-enabled gates controlling the other rows isolate them so that they continue to maintain their stored line of quantized gray level information until individually addressed again. In practice, for the large $x$-$y$ matrix display, the setting pulses applied to the columns are slightly smaller in amplitude than the breakdown voltage of the display element. This permits a small complementary pulse of opposite polarity to be simultaneously applied to the selected row to insure that the switches of the desired row break down; this is done by a Partial Setting Pulse Generator 81. In the above example, the partial setting pulse would be 3 microseconds long and of an amplitude less than $V_H$.

After the completion of erase and setting, the Sustain Waveform generator 79, which is delayed by 10 microseconds each line, and which is connected to all the rows directly through their respective Drivers 77, begins to generate and transmit to all of the Drivers 77 the waveform of FIG. 4. In this case, the generator is adjusted so that the period T of the waveform is less than or equal to that of the trace time, or 53.5 microseconds; the period of the waveform may also be adjusted so that many integral multiples of the waveform cycle will be contained within the trace time. During the retrace portion of the line time, the Multistate Sustain Waveform is not generated since the delay circuit 67 does not furnish an enabling signal to the generator 79 until 10 microseconds after the retrace period begins, allowing one row to be erased and reset during every retrace period. It should be noted that the other rows are unaffected and continue their respective memory states, awaiting the resumption of the Multistate Sustain Waveform with the beginning of the trace time period.

The complementary relation between the amplitudes of the waveform pulses and the preset quantized memory-state voltages must be carefully maintained as was explained in connection with FIGS. 3, 4 and 5, thereby insuring that the Multistate Sustain Waveform causes the elements to fire only at the proper points in accordance with the individual preset memory states. Thus gray scale image reproduction is effected, each element having one of three distinct brightness levels as determined by the video signal.

The matrix arrays and associated addressing of the above-described systems are not merely useful as displays; they are also useful as purely memory systems having the unique feature that more than two logic levels may be provided. For example, the usual computer memory includes basic memory elements of a binary nature having an "OFF" condition, or a logic "0," and an "ON" condition, or a logic "1." However, the present invention, being capable of at least three memory states, plus an OFF or non-conductive state, has the capacity for at least two more logic levels, permitting the storage of base 3, 4, 5 etc. logic as well as merely binary logic. Thus a matrix of memory elements as in FIG. 6 may store a "0," "1," and at least two additional logic levels on any of the elements at any column-row intersection by suitable addressing means with a capability for subsequent erase, after the fashion already discussed above.

Interrogation of each element to determine what state an element has stored upon it may be accomplished in different ways by application of the Multistate Sustain Waveform signal to the elements. For example, the state of each element may be determined by sensing on which part of the waveform conduction occurs, as in the FIG. 4A waveform or, if each state has been assigned a different number of pulse pairs and the memory element has a light-display capability, by sensing the relative intensity of the interrogated element when it is actuated by the Multistate Sustain Waveform signal.

While a particular embodiment of the invention has been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

We claim:

1. A picture display system for storing and reproducing an image formed of picture elements each exhibiting a range of intensity levels and distributed over a panel in a matrix, comprising:

a plurality of memory elements disposed at the respective positions of said picture elements, each of said memory elements having a multi-level voltage storage capacity and exhibiting a conductivity to applied voltage which is responsive to the level of stored voltage;

means for supplying a video signal and position-selection signals;

means for quantizing said video signal into a predetermined number of intensity levels and associating with each such level one of a corresponding number of different setting voltages;

addressing means responsive to said picture selection signals and said quantized video signal for addressing each of said memory elements with applied voltage to store on each element the one of said setting voltages which is associated with the intensity level of said picture information at the corresponding picture element position, forming a pattern of stored setting voltages representative of said picture information;

means for generating and simultaneously applying to said elements a cyclic waveform signal which causes each element to conduct a predetermined number of times per waveform period differing according to the setting voltage stored on the element and the corresponding associated intensity level, so that each element exhibits a duty factor in accordance with the quantized picture information stored upon it, and which further causes each element to preserve its respective setting voltage upon completion of one or more waveform periods until reset by said addressing means to a new setting voltage;

and a plurality of light display means each associated with a respective one of said memory elements to cause light to be emitted for each such conduction to visibly reproduce said stored picture information as a pattern of light intensities over said panel upon the application of said enabling signal to said elements.

2. A picture display system as in claim 1 in which each of said plurality of light display means is integral with each of said plurality of memory display elements.

3. A picture display system as in claim 1 in which said waveform is applied to said elements in an integral number of cycles, said duty factors corresponding to each of said setting voltages are respectively proportional to said quantized video intensity levels associated respectively with said setting voltages.

4. A picture display system as in claim 1 which further includes means for removing said setting voltages from said elements to erase said stored picture information prior to addressing said elements with other picture information.

5. A picture display system as in claim 1 in which:

said elements are distributed in an array of rows and columns, said signal-supplying means comprises a television receiver apparatus which provides an analog video signal with each line of picture information being divided into a trace period and a retrace period, and which further provides horizontal and vertical synchronization signals constituting said position selection signals, said quantizing means quantizes each line of said video signal in a sequential line-by-line manner to provide a plurality of signal segments for each line period, with each segment quantized to the one of said predetermined intensity levels which is closest to the amplitude of said video signal during the duration of said segment and associated with the one of said setting voltages corresponding to said intensity level;

said addressing means sequentially addresses each row of said array during successive retrace periods of said video signal to store upon the elements of each row respective setting voltages associated with corresponding ones of said signal segments in sequence;

and said cyclic waveform signal is applied during trace periods of said video signal to said elements of said array simultaneously, the elements of each row retaining their respective memory states through repeated trace and retrace periods and displaying a respective portion of said image information during said trace period until the row is again reset by said addressing means.

6. A picture display system as defined in claim 1 wherein said cyclic waveform signal includes a plurality of pulse pairs having mutually different amplitude characteristics for establishing a unique correspondence with predetermined setting voltage levels, each pulse pair comprising two pulse constituents of opposite polarity for actuating the associated memory element, one pulse constituent for initially triggering said memory element and the other for resetting said element to its initial setting voltage, said pulse pair constituents being so ordered in said waveform and of such an amplitude that an element once triggered by its associated triggering pulse constituent is immune to triggering thereafter by any pulse constituent other than its associated reset pulse constituent.

7. A system as defined in claim 6 wherein the pulse pairs uniquely associated with certain setting voltage levels are repeated a prescribed different number of times during each cycle of said waveform so that each element is triggered a predetermined number of times during that cycle according to its initial setting voltage and in accordance with the quantized picture intensity information stored thereon.

8. In a picture display system for reproducing an image formed of light-affecting picture elements disposed on a picture display panel, each picture element having a multi-level voltage storage capacity and a breakback-type switching characteristic, apparatus for controlling the activation of said picture elements, comprising:

means for generating setting pulses which uniquely correspond to predetermined video intensity levels;

means for applying to appropriate picture elements respective setting pulses corresponding to the associated levels of picture intensity for storing thereon selected setting voltage levels related to the particular applied setting pulse;

means for generating a cyclic waveform signal composed of a plurality of pulse pairs having mutually different amplitude characteristics corresponding uniquely to predetermined setting voltage levels, each pulse pair comprising two pulse constituents of opposite polarity for actuating the associated memory element, one pulse constituent for initially triggering said memory element and the other for resetting said element to its initial setting voltage, said pulse pair constituents being so ordered in said waveform and of such an amplitude that an element once triggered by its associated triggering pulse constituent is immune to triggering thereafter by any pulse constituent other than its associated reset pulse constituent; and means for applying said cyclic waveform to each picture element such that each pulse pair associated with a selected setting voltage level triggers only those elements initially set to said setting voltage level and no other.

9. A cyclic waveform signal as defined in claim 8 wherein the triggering pulse constituents of the pulse pairs are arranged in each cycle in ascending order of magnitude and have a polarity opposite to that of the setting pulse and an amplitude which, when combined with the setting voltage level stored on the picture elements, is sufficient to activate only those picture elements with which a particular pulse pair is associated, and wherein the reset constituents of the pulse pairs are of a polarity identical to that of said setting pulse and of an amplitude sufficient to activate only those elements which were first activated by their associated triggering pulse constituents.

10. The cyclic waveform signal as defined in claim 9 wherein the pulse pairs uniquely associated with certain setting voltage levels are repeated a prescribed different number of times during each cycle of said waveform so that each element is triggered a predetermined number of times during that cycle according to its initial setting voltage and in accordance with the picture intensity information stored thereon.

11. The apparatus defined in claim 8 wherein the pulse pairs uniquely associated with certain setting voltage levels are repeated a prescribed different number of times during each cycle of said waveform so that each element is triggered a predetermined number of times during that cycle according to its initial setting voltage and in accordance with the picture intensity information stored thereon.

12. A method for controlling, in a picture display system, the activation of picture elements exhibiting a multi-level voltage storage capacity and a breakback-type switching characteristic, comprising:

generating setting pulses which uniquely correspond to predetermined video intensity levels;

applying to appropriate picture elements respective setting pulses corresponding to the associated levels of picture intensity for storing thereon selected setting voltage levels related to the particular applied setting pulse;

generating a cyclic waveform signal composed of a plurality of pulse pairs having mutually different amplitude characteristics corresponding uniquely to predetermined setting voltage levels, each pulse pair comprising two pulse constituents of opposite polarity for actuating the associated memory element, one pulse constituent for initially triggering said memory element and the other for resetting said element to its initial setting voltage, said pulse pair constituents being so ordered in said waveform and of such an amplitude that an element once triggered by its associated triggering pulse constituent is immune to triggering thereafter by any pulse constituent other than its associated reset pulse constituent; and applying said cyclic waveform to each picture element such that each pulse pair associated with a selected setting voltage level triggers only those elements initially set to said setting voltage levels and no other.

13. The method as defined in claim 12 wherein the triggering pulse constituents of the pulse pairs are arranged in ascending order of magnitude, having a polarity opposite to that of the initial setting pulse and an amplitude which when combined with the setting voltage stored on the picture elements is sufficient to activate only those picture elements with which a particular pulse pair is associated, and wherein the reset constituents of the pulse pairs are of a polarity identical to that of said setting pulse and of an amplitude sufficient to activate only those elements which were first activated by their associated triggering pulse constituents.

14. The method as defined in claim 12 wherein the pulse pairs uniquely associated with certain setting voltage levels are repeated a prescribed different number of times during each cycle of said waveform so that each element is triggered a predetermined number of times during that cycle according to its initial setting voltage and in accordance with the quantized picture intensity information stored thereon.

* * * * *